United States Patent
Chikaoka et al.

(10) Patent No.: US 9,075,246 B2
(45) Date of Patent: Jul. 7, 2015

(54) IMAGE DISPLAY DEVICE HAVING LASER LIGHT SCANNING WITH A VARIATION IN SCANNING SPEED

(75) Inventors: Atsuhiko Chikaoka, Osaka (JP); Kenji Nagashima, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 237 days.

(21) Appl. No.: 13/811,576

(22) PCT Filed: Jul. 11, 2011

(86) PCT No.: PCT/JP2011/003965
§ 371 (c)(1),
(2), (4) Date: Jan. 22, 2013

(87) PCT Pub. No.: WO2012/011249
PCT Pub. Date: Jan. 26, 2012

(65) Prior Publication Data
US 2013/0120718 A1    May 16, 2013

(30) Foreign Application Priority Data

Jul. 23, 2010 (JP) ................. 2010-166187

(51) Int. Cl.
*G03B 21/28* (2006.01)
*H04N 9/12* (2006.01)
(Continued)

(52) U.S. Cl.
CPC ............. *G02B 27/48* (2013.01); *G02B 27/18* (2013.01); *H04N 1/40037* (2013.01);
(Continued)

(58) Field of Classification Search
CPC ...... G02B 27/48; G02B 26/105; G02B 27/18; G02B 26/101; H04N 9/3129; H04N 1/40037; G03B 21/14; G03B 21/2033

USPC ........... 353/85, 98; 348/742, 201; 359/196.1; 345/3.2
See application file for complete search history.

(56) References Cited

U.S. PATENT DOCUMENTS

2004/0218155 A1* 11/2004 Schenk et al. ................ 353/98
2005/0141069 A1* 6/2005 Wood et al. ................ 359/196
(Continued)

FOREIGN PATENT DOCUMENTS

| JP | 2001-189520 A | 7/2001 |
| JP | 2003-149577 A | 5/2003 |

(Continued)

OTHER PUBLICATIONS

International Search Report from PCT/JP2011/003965, with an international filing date of Jul. 11, 2011, mailed on Aug. 30, 2011 by the Japanese Patent Office.

*Primary Examiner* — William C Dowling
*Assistant Examiner* — Magda Cruz
(74) *Attorney, Agent, or Firm* — Baker Hostetler LLP

(57) ABSTRACT

Techniques capable of effectively reducing local speckle noise caused by scanning with laser light involving a variation in scanning speed and improving the overall quality of an image are provided. In some examples, a laser light source emits laser light with an output level corresponding to a display grayscale of a pixel according to a predetermined waveform pattern within a pixel display period which is set to increase as a scanning speed is reduced. The waveform pattern is set such that a unique relaxation oscillation of the laser light source increases as the scanning speed is reduced. A scanning mirror reflects the laser light emitted from the laser light source in a predetermined scanning order according to its deflection angle so as to be projected onto a projection surface.

14 Claims, 5 Drawing Sheets

(51) Int. Cl.
*H04N 3/02* (2006.01)
*G02B 26/10* (2006.01)
*G02B 27/48* (2006.01)
*G02B 27/18* (2006.01)
*H04N 1/40* (2006.01)
*G03B 21/14* (2006.01)
*G03B 21/20* (2006.01)
*H04N 9/31* (2006.01)

(52) U.S. Cl.
CPC ............ *G03B 21/14* (2013.01); *G03B 21/2033* (2013.01); *G02B 26/101* (2013.01); *G02B 26/105* (2013.01); *H04N 9/3129* (2013.01)

(56) References Cited

U.S. PATENT DOCUMENTS

2007/0012875 A1* 1/2007 Miyazawa .................... 250/234
2007/0252918 A1* 11/2007 Furuya et al. ................. 348/742
2010/0265473 A1* 10/2010 Yamashita et al. .............. 353/85

FOREIGN PATENT DOCUMENTS

| JP | 2009-133926 A | 6/2009 |
| JP | 2010-008529 A | 1/2010 |
| WO | 2010/125866 A1 | 11/2010 |
| WO | 20121011249 A1 | 1/2012 |

* cited by examiner

IMAGE DISPLAY DEVICE HAVING LASER LIGHT SCANNING WITH A VARIATION IN SCANNING SPEED

CROSS-REFERENCE TO RELATED APPLICATIONS

The present application is a national stage entry of PCT/JP2011/003965, filed Jul. 11, 2011, which claims the benefit of Japanese Application Serial No. 2010-166187, filed Jul. 23, 2010.

TECHNICAL FIELD

The present invention relates to an image display device, and more particularly, to measures for speckle noise of an image which is displayed on a projection surface by scanning with laser light.

BACKGROUND ART

The Patent Literature 1 discloses a laser projector which reflects laser light emitted from a laser light source using a scanning mirror so as to be projected onto a projection surface, thereby displaying an image on the projection surface. The scanning mirror can be displaced in two axial directions and oscillates at a unique resonance frequency thereof to perform laser scanning. In the laser projector, flickering with a minute speckle shape which is called speckle noise occurs due to a unique coherence of the laser light. In order to reduce the speckle noise, various methods have been proposed. As one of the methods, the Patent Literature 2 discloses a method using the relaxation oscillation of a laser light source. In the method, the laser light source is driven using a rectangular waveform pattern in which on and off states are alternately repeated. The laser light source starts the relaxation oscillation at the time when the level rises from the off state to the on state and continuously performs the relaxation oscillation within an on period. The on period is set to be equal to or shorter than the time when the relaxation oscillation converges. Therefore, an output level of the laser light source fluctuates over the entire on period and the coherence of the laser light is reduced. As a result, the speckle noise is reduced.

CITATION LIST

Patent Literature

[Patent Literature 1] JP-A-2009-175428
[The Patent Literature 2] JP-A-2001-189520

SUMMARY OF INVENTION

Technical Problem

As disclosed in the Patent Literature 1, in the laser scanning by the resonance frequency, the speed at which a laser spot is moved on the projection surface in the scanning direction, that is, a scanning speed is not constant, but is different in an image region on the projection surface. The speed characteristics are caused by a periodic change in the deflection angle (angular speed) of the scanning mirror per unit time. The scanning mirror is driven by a driving current corresponding to the resonance frequency and the deflection angle thereof is changed in a sine wave shape on a time axis. The angular speed of the mirror is the highest at the minimum deflection angle and is the lowest at the maximum deflection angle. Therefore, the scanning speed which is operatively associated with the angular speed of the mirror is the highest in the center region of the image corresponding to the minimum deflection angle and is the lowest in the side region (in the vicinity of the left and right ends) corresponding to the maximum deflection angle. In this case, when a display period of one pixel is constant, the display size (the width of a pixel in the scanning direction) of one pixel which is determined by the integral of the time and the speed in the side region is less than that in the center region. In order to maintain a constant pixel size, it is necessary to set the display period of one pixel in the side region to be longer than that in the center region, thereby compensating for the difference in speed with the time.

In the laser scanning involving a variation in the scanning speed, when the waveform pattern is uniformly applied as disclosed in the Patent Literature 2, a sufficient speckle noise reduction effect is not obtained in the regions of pixels (pixels with a long pixel display period) with a low scanning speed. The reason is as follows. When the number of times the state is changed from the off state to the on state in the waveform pattern is constant, that is, the number of relaxation oscillations is constant, the temporal ratio of the relaxation oscillation in the display period of one pixel is reduced as the display period increases. As a result, local speckle noise is likely to remain in the side region of the image, even though speckle noise measurements are performed.

An object of the invention is to effectively reduce the local speckle noise caused by the laser scanning involving a variation in the scanning speed and improve overall image quality.

Solution to Problem

In order to solve the above-mentioned problems, according to a first aspect of the invention, there is provided an image display device that includes a laser light source and a scanning mirror and displays an image on a projection surface using scanning with laser light involving a variation in a scanning speed. The laser light source emits the laser light with an output level corresponding to a display grayscale of a pixel within a pixel display period which is set to increase as the scanning speed is reduced such that a total time of a unique relaxation oscillation of the laser light source increases as the scanning speed is reduced. The scanning mirror reflects the laser light emitted from the laser light source according to its deflection angle in a predetermined scanning order so as to be projected onto the projection surface.

According to a second aspect of the invention, there is provided an image display device that includes a laser control unit, a laser light source, and a scanning mirror and displays an image on a projection surface using scanning with laser light involving a variation in a scanning speed. The laser control unit selects a first waveform pattern for a first pixel and selects a second waveform pattern for a second pixel which is scanned at a lower scanning speed than the first pixel. The first waveform pattern generates a unique relaxation oscillation of the laser light source within a first pixel display period. The second waveform pattern generates a larger number of relaxation oscillations than the first waveform pattern within a second pixel display period longer than the first pixel display period. The laser light source emits the laser light with an output level corresponding to a display grayscale of the first pixel according to the first waveform pattern selected by the laser control unit and emits the laser light with an output level corresponding to a display grayscale of the second pixel according to the second waveform pattern selected by the laser control unit. The scanning mirror reflects the laser light related to the first pixel which is emitted from the laser light source and the laser light related to the second pixel which is emitted from the laser light source in a predetermined scanning order according to its deflection angle so as to be projected onto the projection surface.

According to a third aspect of the invention, there is provided an image display device that includes a laser control unit, a laser light source, and a scanning mirror and displays an image on a projection surface using scanning with laser light involving a variation in a scanning speed. The laser control unit selects a first waveform pattern for a first pixel and selects a second waveform pattern for a second pixel which is scanned at a lower scanning speed than the first pixel. The first waveform pattern includes at least one on period which rises from an off state within a first pixel display period. The second waveform pattern includes a larger number of on periods rising from the off state than the first waveform pattern within a second pixel display period longer than the first pixel display period. The laser light source emits the laser light with an output level corresponding to a display grayscale of the first pixel according to the first waveform pattern selected by the laser control unit and emits the laser light with an output level corresponding to a display grayscale of the second pixel according to the second waveform pattern selected by the laser control unit. The scanning mirror reflects the laser light related to the first pixel which is emitted from the laser light source and the laser light related to the second pixel which is emitted from the laser light source in a predetermined scanning order according to its deflection angle so as to be projected onto the projection surface.

In the image display device according to the third aspect of the invention, the first waveform pattern and the second waveform pattern may be formed by repeating a constant modulation period including the on period and an off time which are generated on the basis of the same reference clock. In addition, a driving current supplied to the laser light source may be set to a level equal to or less than a bias current of the laser light source within the off period, regardless of the display grayscale, and may be set to the current level corresponding to the display grayscale within the on period.

In the image display device according to any one of the first to third aspects of the invention, the deflection angle of the scanning mirror may be changed in a sine wave shape on a time axis by a driving current having a unique resonance frequency of the scanning mirror.

Advantageous Effects of Invention

According to the first to third aspects of the invention, since the coherence of the laser light is reduced by the relaxation oscillation of the laser light source, the speckle noise is reduced. In this case, in order to compensate for a difference in the scanning speed, the number of relaxation oscillations for a pixel with a long pixel display period is more than that for a pixel with a short pixel display period, or the total time of the relaxation oscillation for the pixel with a long pixel display period is more than that for the pixel with a short pixel display period. Therefore, it is possible to prevent a reduction in the temporal ratio of the relaxation oscillation due to an increase in the pixel display period. As a result, it is possible to effectively reduce the speckle noise in the region of the pixel (pixel with a low scanning speed) with a long pixel display period in addition to the region of the pixel (pixel with a high scanning speed) with a short pixel display period and thus improve overall image quality.

DESCRIPTION OF EMBODIMENTS

Figure 1:
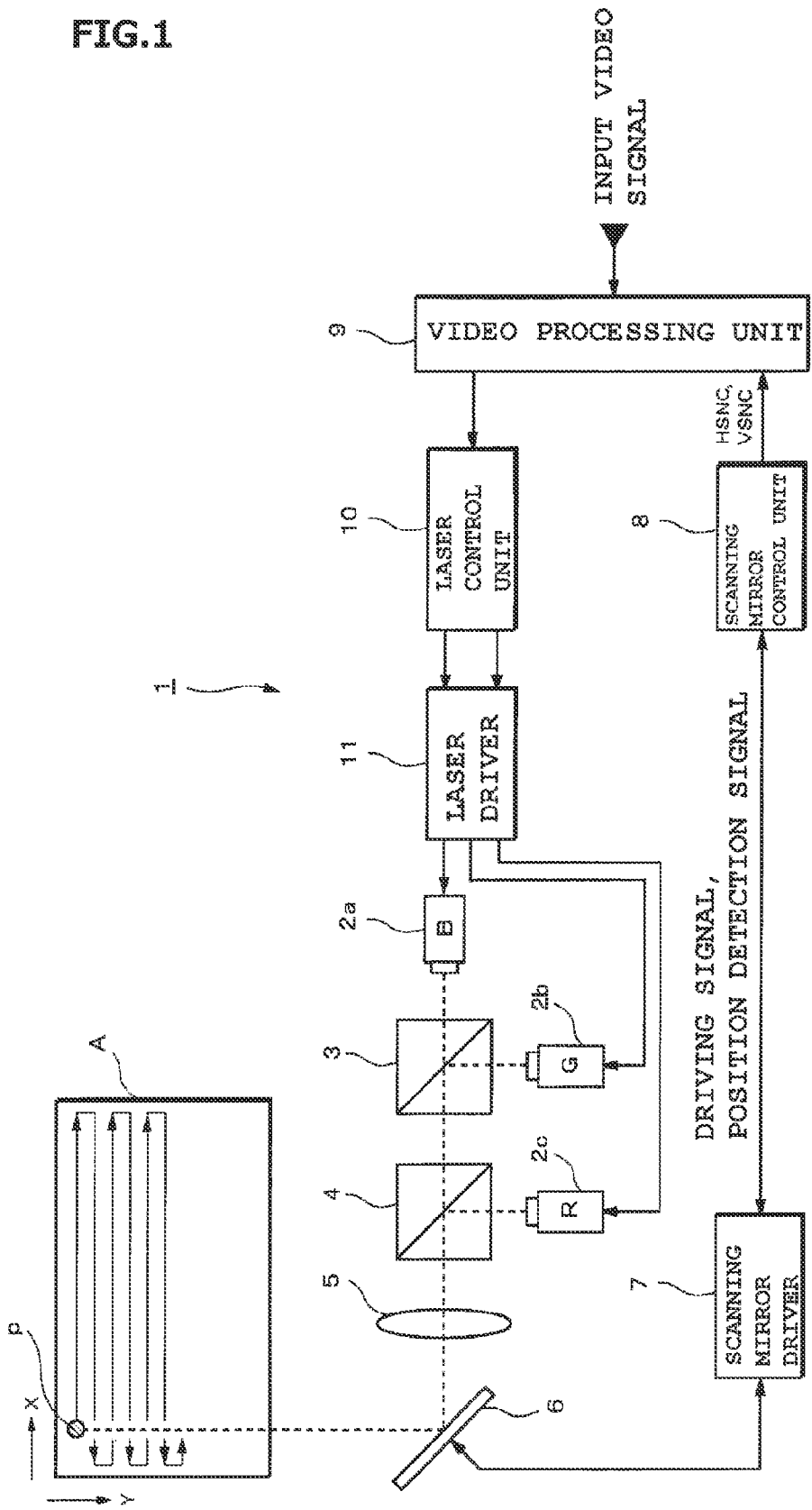
FIG. 1 A block diagram illustrating the structure of a laser projector.

FIG. 1 is a block diagram illustrating the structure of a laser projector according to this embodiment. A laser projector 1 mainly includes laser light sources 2a to 2c, various optical elements 3 to 5, a scanning mirror 6, and various driving and control units 7 to 11. The laser projector 1 combines red, blue, and green laser light components and projects the combined light onto a projection surface A, such as a screen or a wall, such that a color image corresponding to a video signal is displayed on the projection surface A. Since the laser projector 1 uses laser light with very high directivity, it has the advantage that it is not necessary to adjust a focus according to the distance to the projection surface A.

The laser light sources 2a to 2c are independently driven by driving currents which are individually supplied from the laser driver 11. Therefore, laser light components with specific wavelengths are emitted from the laser light sources 2a to 2c. For example, a blue component (B) is emitted from the laser light source 2a, a green component (G) is emitted from the laser light source 2b, and a red component (R) is emitted from the laser light source 2c. The dichroic mirrors 3 and 4 transmit only laser light components with a specific wavelength and reflect the other laser light components, thereby combining the color laser light components emitted from the laser light sources 2a to 2c. Specifically, the blue and green laser light components emitted from the laser light sources 2a and 2b are combined by the dichroic mirror 3 which is arranged on the upstream side of an optical path and are then emitted to the dichroic mirror 4 which is arranged on the downstream side of the optical path. The emitted combined light is further combined with the red laser light component emitted from the laser light source 2c by the dichroic mirror 4 and the combined light is emitted as final target color light. The emitted color light is incident on the scanning mirror 6 through the lens 5.

The scanning mirror 6 reflects the incident color light according to its deflection angle (phase) so as to be projected onto the projection surface A. The scanning mirror 6 has two-dimensional flexibility corresponding to a horizontal direction X and a vertical direction Y of the projection surface A and performs line-sequential scanning corresponding to the two-dimensional displacement to form an image on the projection surface A. The line-sequential scanning is continuously performed in one frame by repeating a process of moving a laser spot p in one direction on a given horizontal line on the projection surface A and returning the laser spot p in the opposite direction on the next horizontal line. There are some types of scanning mirrors 6 according to driving methods and any type of scanning mirror may be used. A type of scanning mirror using a MEMS (Micro Electro Mechanical Systems) technique is easy to acquire and is advantageous in reducing the overall size and power consumption of a device and increasing the processing speed.

Figure 2:
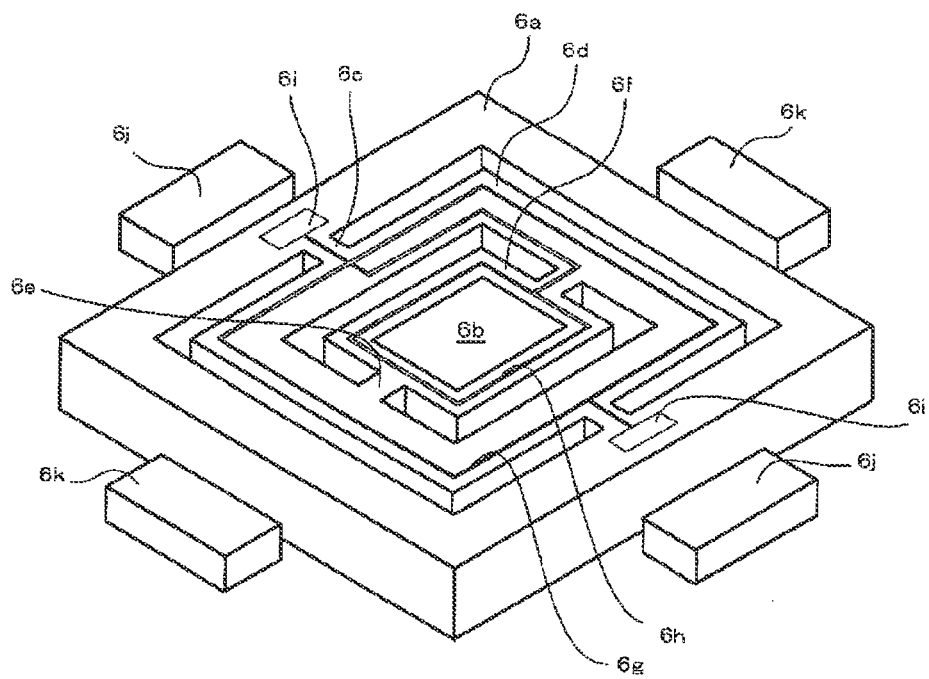
FIG. 2 A perspective view illustrating the outward appearance of a scanning mirror.

FIG. 2 is a perspective view illustrating the outward appearance of the scanning mirror 6. An external frame 6d with a rectangular frame shape is swingably attached to the inside of a substrate 6a with a rectangular frame shape through an external rotating shaft 6c. In addition, an internal frame 6f with a rectangular frame shape is swingably attached to the inside of the external frame 6d through an internal rotating shaft 6e and a mirror 6b is provided at the center of the internal frame 6f. The reflection direction of the mirror 6b which is attached to the substrate 6a through the internal and external frames 6d and 6f is uniquely specified on the basis of the amount of rotation (deflection angle θh) of the internal frame 6f about the internal rotating shaft 6e and the amount of rotation (deflection angle θv) of the external frame 6d about the external rotating shaft 6c perpendicular to the internal rotating shaft 6e. An external coil 6g is provided in the external frame 6d so as to surround the mirror 6b and an internal coil 6h is provided in the internal frame 6f so as to surround the mirror 6b. The coils 6g and 6h are electrically separated from each other and are connected to a pair of electrodes 6i. A driving current is individually supplied to each of the coils 6g and 6h through the electrodes 6i. Two sets of permanent magnet pairs 6j to 6k are provided outside the substrate 6a so as to be perpendicular to each other. One permanent magnet pair 6j is arranged such that the N-pole and the S-pole face each other in the axial direction of the external rotating shaft 6c. The other permanent magnet pair 6k is arranged such that the N-pole and the S-pole face each other in the axial direction of the internal rotating shaft 6e.

An operation principle when the mirror 6b is electromagnetically driven to perform scanning is as follows. First, when a driving current for horizontal scanning is supplied to the electrodes 6i, the mirror 6b is swung about the internal rotating shaft 6e by an electromagnetic force generated between the internal coil 6h to which the driving current flows and one permanent magnet pair 6j. For one horizontal scanning period corresponding to ½ of the swinging period, the mirror 6b sequentially reflects the laser light corresponding to one horizontal direction which is emitted from the laser light sources 2a to 2c over time such that an image corresponding to one horizontal line is projected and displayed on the projection surface A (horizontal scanning). On the other hand, when a driving current for vertical scanning is supplied to the electrodes 6i, the mirror 6b is swung about the external rotating shaft 6c by an electromagnetic force generated between the external coil 6g to which the driving current flows and the other permanent magnet pair 6k. For one vertical scanning period corresponding to ½ of the swinging period, the reflection of laser light corresponding to one horizontal line is repeated the number of times corresponding to the number of horizontal lines to project and display one frame of images on the projection surface A (vertical scanning).

Figure 3:
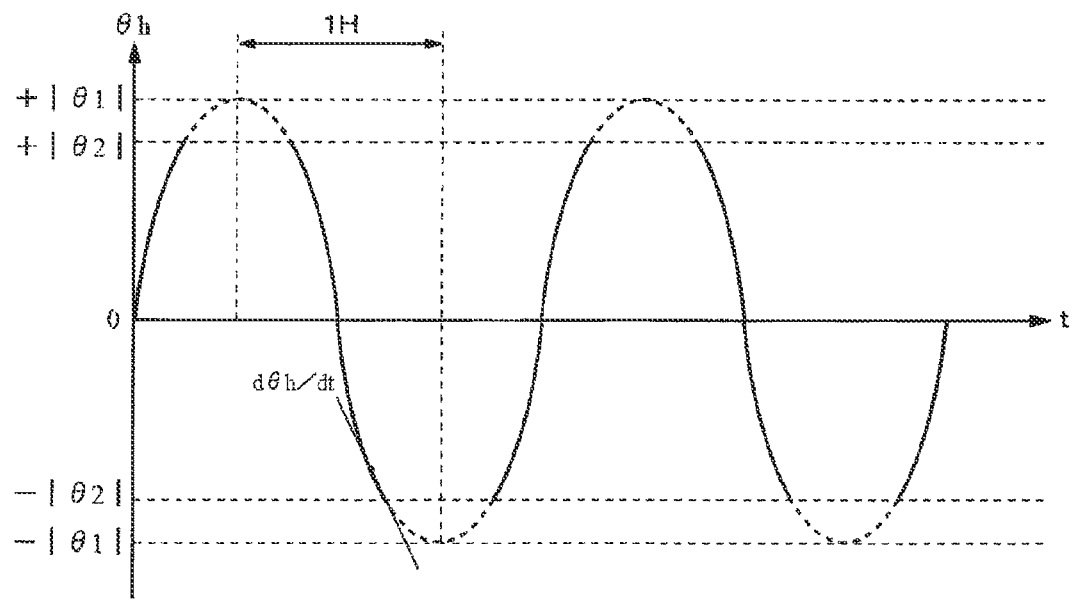
FIG. 3 A characteristic diagram illustrating the deflection angle of the mirror in horizontal scanning.

FIG. 3 is a characteristic diagram illustrating the deflection angle θh of the mirror 6b for the horizontal scanning. In this embodiment, for the horizontal scanning, the mirror 6b is driven by a resonance frequency to continuously change the deflection angle θh. The resonance frequency means a frequency at which a current value required to swing the mirror 6b is the minimum and is a unique value of the mirror which is uniquely specified according to, for example, the dimensions of the mirror 6b and the density and hardness of a material. When the mirror 6b is swung so as to correspond to the resonance frequency, it is possible to obtain a large amplitude (θh=|θ1|) of the mirror with a small current value. However, the mirror 6b may be swung at frequencies other than the resonance frequency. In this case, a larger current value than that when the mirror 6b is driven at the resonance frequency is needed.

In this case, the displacement of the deflection angle θh on the time axis is a sine wave shape and half of the period thereof corresponds to one horizontal scanning period (1H). An angular speed dθh/dt of the mirror 6b is the highest at a deflection angle θh of 0 and is gradually reduced as |θh| increases. The angular speed dθh/dt is zero when |θh| is θ1 (maximum deflection angle). However, a phase range (−|θ2|≤θ≤+|θ2|) which is narrower than a phase range (−|θ1|≤θ≤+|θ1|) up to the maximum deflection angle, not the phase range (−|θ1|≤θ≤+|θ1|), is used as an effective range which is actually used in image display. The reason is as follows. The angular speed dθh/dt is zero at the maximum deflection angle |θ1|. Therefore, when the angular speed is included, the size of a pixel (the width of a pixel in the horizontal direction) on the projection surface A which is determined by the integral of the display period of one pixel and the scanning speed is theoretically zero and it is difficult to ensure the same size as that of other pixels.

The deflection angle θv of the mirror 6b in the vertical scanning is controlled by DC, not the resonance frequency. Therefore, the deflection angle θv is changed stepwise according to the level of the driving current and the mirror 6b is stopped at the deflection angle θv corresponding to the level. The switching of the level of the driving current is repeated the number of times corresponding to the number of horizontal lines for one vertical scanning period. In this way, the phase range of the deflection angle θv corresponding to the height (the number of horizontal lines) of the image to be displayed is ensured. In this case, unlike the horizontal scanning, the displacement of the deflection angle θv on the time axis is linear and an angular speed dθv/dt is constant. In addition, there is a type of electromagnetically driven-scanning mirror in which both the horizontal scanning and the vertical scanning are performed by the resonance frequency. This type of scanning mirror may be used as the scanning mirror 6.

The scanning mirror driver 7 supplies the driving current to the scanning mirror 6 to drive the scanning mirror 6 in a predetermined scanning order. In addition, the scanning mirror driver 7 detects the position (deflection angles θh and θv) of the mirror 6b in the scanning mirror 6. Information about the detected position is transmitted as a position detection signal to the scanning mirror control unit 8. For example, the position of the mirror 6b may be detected as follows. Torsion sensors are provided in the rotating shaft 6c which connects the substrate 6a and the external frame 6d and the rotating shaft 6e which connects the internal and external frames 6d and 6f and individually detect the torsion angles of the rotating shafts 6c and 6e. In addition, a light receiving element (for example, a photodiode) may be arranged in the vicinity of the mirror 6b and detect the position of reflected light which is operatively associated with the deflection angle of the mirror 6b.

The scanning mirror control unit 8 controls the scanning mirror 6 such that a predetermined image region is scanned with the laser light incident on the scanning mirror 6 at a predetermined frequency. The scanning mirror control unit 8 outputs a driving signal to the scanning mirror driver 7 to perform the above-mentioned control operation. The scanning mirror control unit 8 generates a horizontal synchronous signal HSNC and a vertical synchronous signal VSNC on the basis of the position detection signal from the scanning mirror driver 7 and outputs the generated signals to the video processing unit 9. The laser light needs to be emitted from the laser light sources 2a to 2c in synchronization with the phase control of the scanning mirror 6. The horizontal and vertical synchronous signals HSNC and VSNC are used for the synchronization. That is, in the laser projector 1, the scanning mirror 6 is mainly driven and the laser light sources 2a and 2c are driven so as to be synchronized with the driving of the scanning mirror 6 on the basis of the internally generated horizontal and vertical synchronous signals HSNC and VSNC.

The video processing unit 9 frequently writes an input video signal (video data) supplied from an external device to a frame buffer (not shown) at the time defined by a synchronous signal supplied from the external device. In addition, the video processing unit 9 sequentially reads the video data stored in the frame buffer and transmits the video data to the laser control unit 10 at the time defined by the horizontal and vertical synchronous signals HSNC and VSNC supplied from the scanning mirror control unit 8.

The laser control unit 10 determines a driving current (current level) for each pixel and a waveform pattern PT to be applied thereto on the basis of the video data which is sequentially transmitted from the video processing unit 9. The laser light sources 2a to 2c are individually controlled and driven by the laser driver 11 on the basis of the driving current and the waveform pattern PT which are set for each color component. In this embodiment, a plurality of waveform patterns PT are prepared and selectively applied according to the position of the pixel on the plane of the image. The laser control unit 10 performs driving current feedback control on the basis of the amount of laser light detected by a photodetector (not shown) such that the amount of light emitted is stabilized in each grayscale. In this way, even when an optical output is changed due to an increase in the temperature of the laser light sources 2a to 2c, it is possible to effectively respond to the change.

The laser driver 11 modulates the driving current (current level) for each color component using the waveform pattern PT output from the laser control unit 10 and outputs the modulated driving current to the laser light sources 2a to 2c. In this way, the laser light sources 2a to 2c emit laser light with an output level corresponding to the grayscale to be displayed according to the waveform pattern PT. Final color light obtained by combining each emitted color light components is guided to the scanning mirror 6 whose position is controlled in synchronization with the emission of the laser light and is projected at a desired pixel position on the projection surface A.

Figure 4:
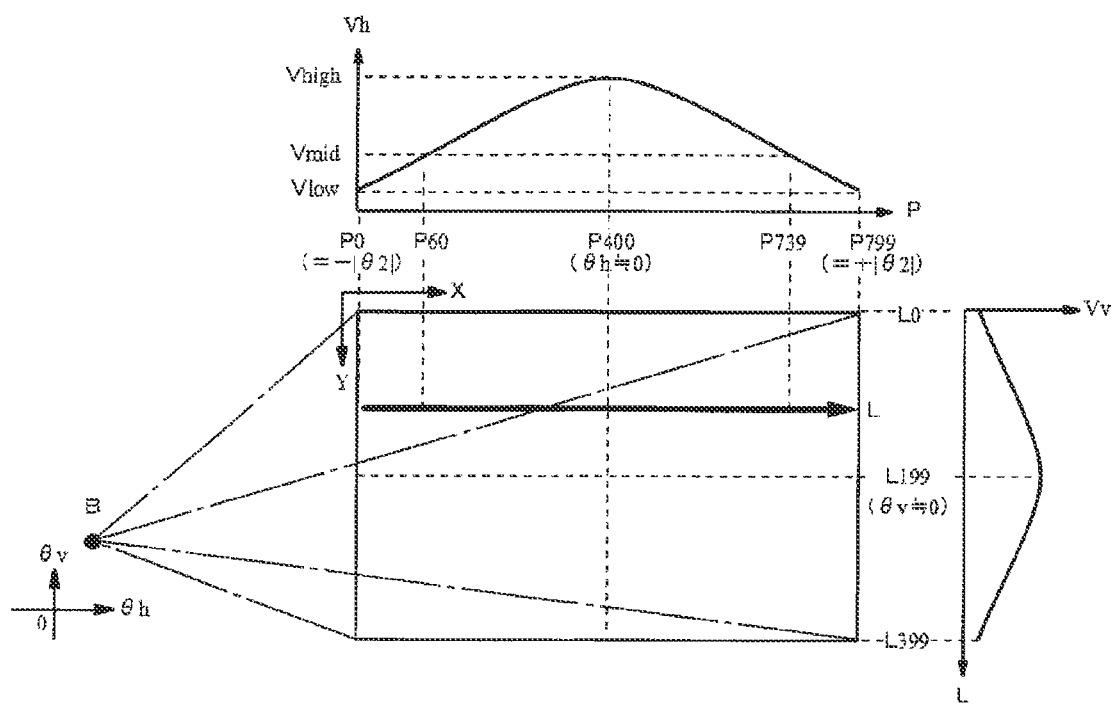
FIG. 4 A diagram illustrating laser scanning for a projection surface.

FIG. 4 is a diagram illustrating the laser scanning for the projection surface A. Laser light emitted from an emission point B of the laser projector 1 is projected onto the projection surface A and a laser spot is formed and displayed at one end (for example, the left end) of a given horizontal line L. For example, the laser spot is moved on the horizontal line L from the left side to the right side with the displacement of the deflection angle $\theta h$ of the mirror 6b. A scanning speed Vh of the laser spot is changed similarly to the angular speed $d\theta h/dt$ of the mirror 6b. Specifically, when an image is displayed in a range of $-|\theta 2| \leq \theta h \leq +|\theta 2|$, the scanning speed is the lowest (Vh=Vlow) in pixels P0 and P799 on both sides which correspond to the maximum deflection angle ($\theta h=\pm|\theta 2|$) and continuously increases toward a center pixel P400 (for example, Vh=Vmid in pixels P60 and P739). The scanning speed is the highest (Vh=Vhigh) in the center pixel P400 corresponding to the minimum deflection angle ($\theta h=0$). The characteristics of the scanning speed Vh are symmetrical with respect to the center of the image, similarly to the angular speed $d\theta v/dt$.

Figure 5:
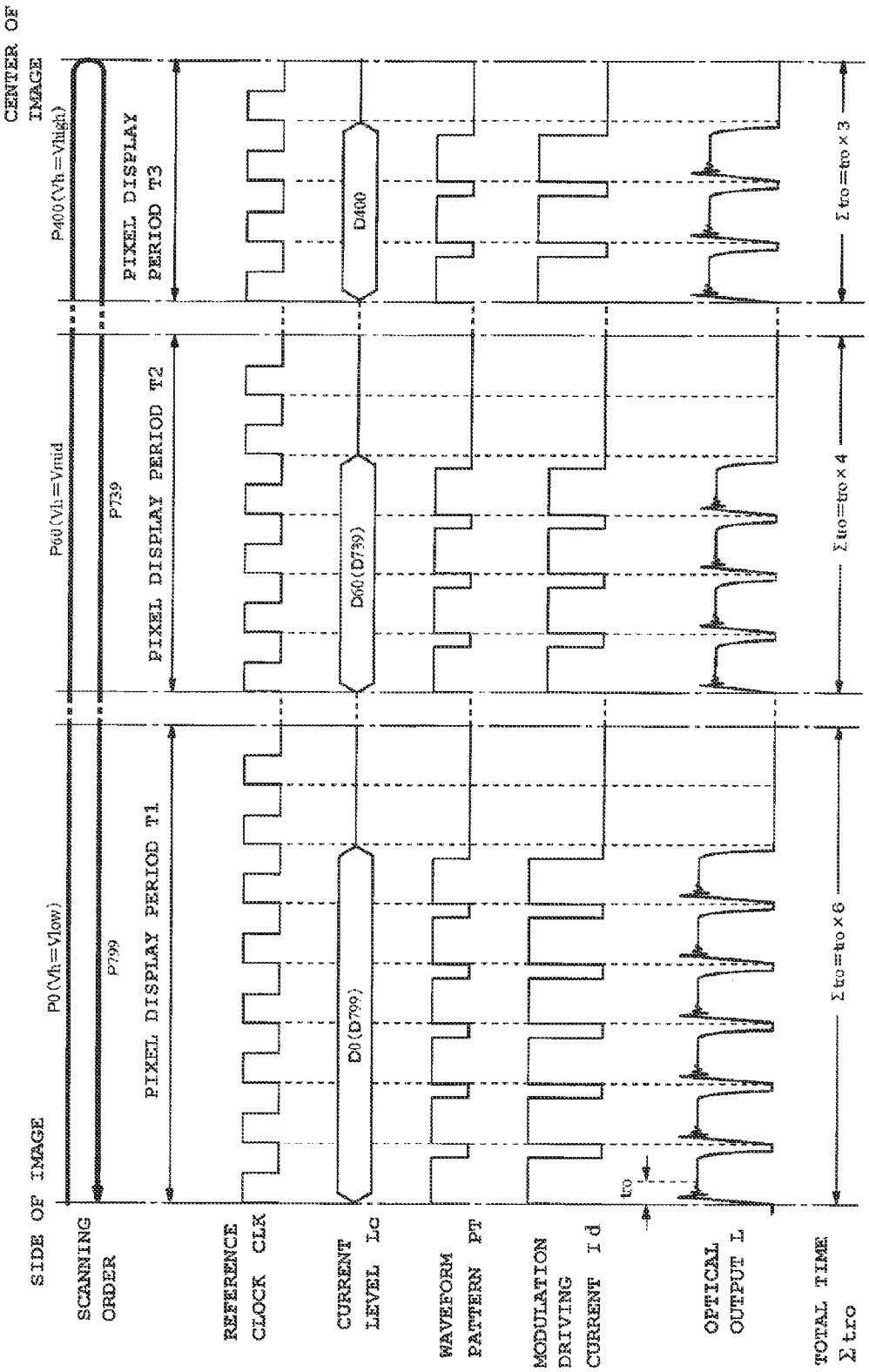
FIG. 5 A timing chart illustrating a laser control and driving system.

FIG. 5 is a timing chart illustrating the laser control and driving system. Next, the operation of the laser control unit 10 and the laser driver 11 will be described in detail using the pixels P0, P60, P400, P739, and P799 (see FIG. 4) which are sequentially scanned on the same horizontal line as an example. Pixel display periods T1 to T3 shown in FIG. 5 are defined by a dot-clock signal which is synthesized with the horizontal and vertical synchronous signals HSNC and VSNC.

The laser projector 1 optically forms pixels using the irradiation of the laser light, unlike, for example, a liquid crystal display in which pixels are physically formed. In this case, the size of one pixel (the width of the pixel in the horizontal direction) displayed on the projection surface A is determined on the basis of the integral of the pixel display period for which laser light corresponding to one pixel is continuously emitted and a scanning speed Vlh of the laser spot. For example, the size of the side pixels P0 and P799 which are disposed on both sides of the image is determined by Vlow×T1, the size of the center pixel P400 which is disposed at the center of the image is determined by Vhigh×T3, and the size of the intermediate pixels P60 and P739 which are disposed between both sides and the center is determined by Vmid×T2. When the scanning speed Vh is different for each pixel, it is necessary to adjust the difference in the scanning speed Vh using the pixel display period in order to maintain all pixel sizes to be constant. Theoretically, the scanning speed Vh may be set on the basis of the reciprocal ratio. That is, when the ratio (T1:T2:T3) of the pixel display periods is set to 1/Vlow:1/Vmid:1/Vhigh for the ratio (Vlow:Vmid:Vhigh) of the scanning speeds Vh, the pixel size can be uniformized. In this way, the pixel display periods satisfy the relationship T1>T2>T3 and are gradually increased from the center pixel P400 to the side pixels P0 and P799. In this embodiment, the pixel display period is set in a pixel unit, which is the minimum unit of the image. However, when the above-mentioned temporal accuracy is not required, the pixel display period may be set at a resolution less than the pixel unit, that is, in an area unit including a plurality of adjacent pixels. When the pixel display period is set in the area unit, the areas do not need to have the same number of pixels, but may have different numbers of pixels. For example, an area with a larger variation in the scanning speed Vh is divided into a large number of areas and a smaller number of pixels are allocated to the area.

Figure 6:
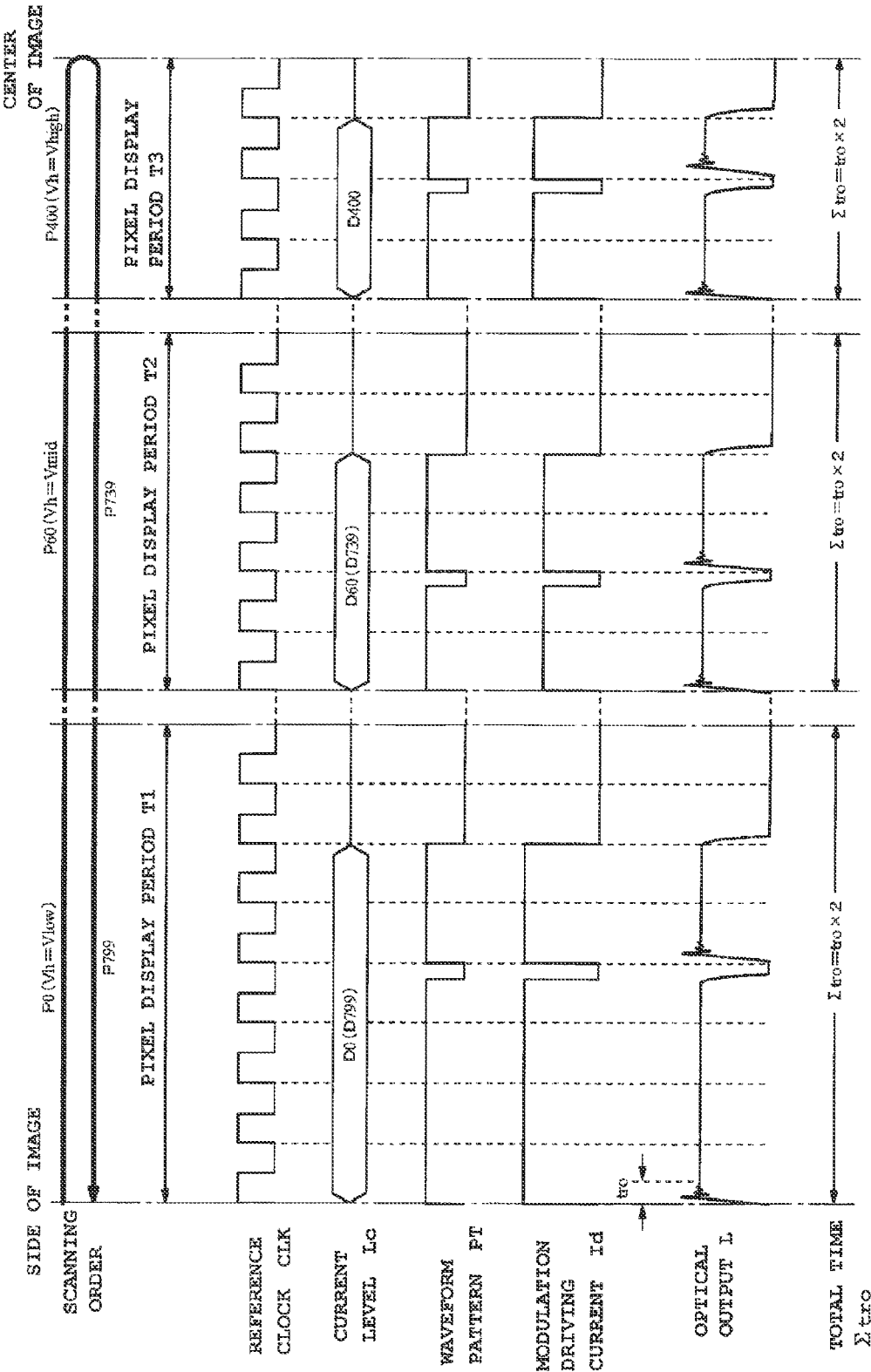
FIG. 6 A timing chart illustrating a laser control and driving system according to a comparative example.

In order to reduce the speckle noise, it is effective to perform relaxation oscillation for the laser light sources 2a to 2c to reduce the coherence of the laser light (incoherence), which is disclosed in PTL 1. However, when the relaxation oscillation is performed for all pixels the same number of times or for a constant time, a sufficient noise reduction effect is not obtained in a pixel region with a low scanning speed (pixel region in which the display period of one pixel is long). For example, in a comparative example shown in FIG. 6, the waveform pattern PT in which there are two rising edges from off to on is common to all pixels. In this case, the laser light sources 2a to 2c perform two relaxation oscillation operations defined by the waveform pattern PT for each pixel display period. Since laser light with low coherence is emitted by the relaxation oscillation, the effect of reducing the speckle noise is obtained. When the time from the start of the relaxation oscillation of the laser light sources 2a to 2c due to a rapid rise of a driving current Id to the convergence of the relaxation oscillation is a "relaxation oscillation time tro", a sum $\Sigma$tro of the relaxation oscillation time tro within the pixel display period is constant for all pixels ($\Sigma$tro=tro×2). In this case, as the pixel display periods increase in the order of T3, T2, and T1, the temporal ratio of the total time $\Sigma$tro in the pixel display period is reduced. This means that, within the pixel display period, the emission ratio of incoherent laser light is reduced and the emission ratio of the original coherent laser light increases. As a result, the effect of reducing noise is reduced toward the side pixels P0 and P799 and local speckle noise remains.

In order to reduce the local speckle noise, as shown in FIG. 5, the relaxation oscillation increases as the scanning speed Vh is reduced, within the pixel display period which is set to increase as the scanning speed Vh is reduced. Typically, the waveform pattern PT which is synchronized with a reference clock CLK may be generated in each predetermined unit using the internally generated reference clock CLK and the laser light sources 2a to 2c may be driven on the basis of the waveform pattern PT. In this embodiment, it is assumed that the waveform pattern PT is set in a pixel unit. However, the waveform pattern PT may be set in an area unit that is coarser than the pixel unit.

Specifically, the laser control unit 10 generates waveform patterns PT1 to PT3 corresponding to the pixels on the basis of the reference clock CLK. The waveform patterns PT1 to PT3 define the on and off periods of the laser light sources 2a to 2c within the pixel display periods T1 to T3. As the pixel display periods T1 to T3 increase, the waveform patterns PT also increase. Within the on period, the driving current is set to a level Lc corresponding to a display grayscale. Within the off period, a current Ioff (for example, 0) that is equal to or less than a bias current Ith (a boundary value between LED emission and laser oscillation) of the laser light sources 2a to 2c is set, regardless of the display grayscale. Within the pixel display periods T1 to T3, the off period between adjacent on periods is set in order to start the relaxation oscillation at the rising time from an off state to an on state and the length of the period may be appropriately set. The off period which is arranged at the end of the pixel display period is prepared for an initial rise to the on state in the next pixel display period and means a blanking period which prevents the mixing between adjacent pixels.

When the waveform pattern PT is formed by repeating a constant modulation period including the on and off periods, it is possible to generate an accurate waveform pattern with a relatively simple circuit. In the modulation period, the on period can be defined as, for example, the pulse width of a one-shot pulse which is generated at each rising time of the reference clock CLK. In this case, in all waveform patterns PT, a single on period and a single off period are each constant and the waveform patterns PT are defined only by the number of repetitions of the modulation period. The reason why periodicity is given to the waveform pattern PT is that it is easy to generate a high-accuracy waveform without a generation circuit for the waveform pattern being complicated. When this point is not considered, a complicated waveform pattern without periodicity may be used.

For the center pixel P400 with the shortest pixel display period T3, the laser control unit 10 generates the current level Lc for each color component corresponding to a display grayscale D400 and the waveform pattern PT common to the color components within a first-half period corresponding to three cycles of the reference clock CLK. The waveform pattern PT includes at least one on period rising from the off state in order to generate the relaxation oscillation in the laser light sources 2a and 2c. In this embodiment, three on periods are provided. The laser driver 11 modulates the current level Lc of the waveform pattern PT output from the laser control unit 10 for each color component and outputs the modulated driving current Id to the laser light sources 2a to 2c. Then, the laser light sources 2a to 2c emit laser light with an output level corresponding to the display grayscale D400 according to the waveform pattern PT. The final color light obtained by combining the emitted color light components is guided to the scanning mirror 6 whose position is controlled in synchronization with the emission of the laser light and is projected at the position of the center pixel P400 on the projection surface A. When the center pixel P400 is displayed, three relaxation oscillations occur within the pixel display period T3 and the total time $\Sigma$tro is tro×3. The number of relaxation oscillations is appropriately set to effectively reduce the speckle noise in the display region of the center pixel P400.

For the intermediate pixel P60 (P739) with the pixel display period T2, the laser control unit 10 generates the current level Lc for each color component corresponding to a display grayscale D60 (D739) and the waveform pattern PT common to the color components within a first-half period corresponding to four cycles of the reference clock CLK. The waveform pattern PT includes four on periods rising from the off state in order to generate more relaxation oscillations than those of the center pixel P400. The laser driver 11 modulates the current level Lc of the waveform pattern PT output from the laser control unit 10 for each color component and outputs the modulated driving current Id to the laser light sources 2a to 2c. Then, the laser light sources 2a to 2c emit laser light with an output level corresponding to the display grayscale D60 (D739) according to the waveform pattern PT. When the intermediate pixel P60 (P739) is displayed, four relaxation oscillations more than those of the center pixel P400 occur within the pixel display period T2. An increment in the pixel display period T2 is predicted. The number of relaxation oscillations is increased to be more than that of the center pixel P400 to increase the total time $\Sigma$tro (=tro×4), thereby effectively reducing the speckle noise in the display region of the intermediate pixel P60 (P739).

For the side pixel P0 (P799) with the longest pixel display period T1, the laser control unit 10 generates the current level Lc for each color component corresponding to a display grayscale D0 (D799) and the waveform pattern PT common to the color components within a first-half period corresponding to six cycles of the reference clock CLK. The waveform pattern PT includes six on periods rising from the off state in order to generate more relaxation oscillations than those of the center pixel P400 and the intermediate pixel P60 (P739). The laser driver 11 modulates the current level Lc of the waveform pattern PT output from the laser control unit 10 for each color component and outputs the modulated driving current Id to the laser light sources 2a to 2c. Then, the laser light sources 2a to 2c emit laser light with an output level corresponding to the display grayscale D0 (D799) according to the waveform pattern PT. When the side pixel P0 (P799) is displayed, six relaxation oscillations more than those of the center pixel P400 and the intermediate pixel P60 (P739) occur within the pixel display period T1. An increment in the pixel display period T1 is predicted. The number of relaxation oscillations is further increased to increase the total time $\Sigma$tro (=tro×6), thereby effectively reducing the speckle noise in the display region of the side pixel P0 (P799).

As such, according to this embodiment, within the pixel display periods T1 to T3 which increase as the scanning speed Vh is reduced, laser light with the output level Lc corresponding to the display grayscale of the pixel is emitted while the number of relaxation oscillations increases as the scanning speed Vh is reduced. Incoherent laser light is emitted by the relaxation oscillation of the laser light sources 2a to 2c and the speckle noise is reduced. In addition, since a reduction in the temporal ratio of the relaxation oscillation is prevented with an increase in the pixel display periods T1 to T3, it is possible to effectively reduce the speckle noise in the display regions of the pixels P0 and P799 with the long pixel display period T1 (Vh=Vlow) in addition to the display region of the pixel P400 with the short pixel display period T3 (Vh=Vhigh). Since the speckle noise which is likely to remain locally in the side region of the image is effectively reduced, it is possible to improve the overall quality of the image.

In the above-described embodiment, a method of adjusting the number of relaxation oscillations within the display period according to the length of the pixel display period has been described. When the on period with a length equal to or more than the relaxation oscillation time tro is constant and the number of relaxation oscillations increases, the total time Σtro also increases. That is, it is guaranteed that the number of relaxation oscillations is proportional to the total time Σtro of the relaxation oscillation. However, instead of adjusting the number of relaxation oscillations, the length of the on period may be changed while maintaining the number of relaxation oscillations at the same value. In this case, the same effect as described above is obtained. For example, for the center pixel P400 with the shortest pixel display period T3, an on period ton shorter than the relaxation oscillation time tro is set (ton<tro) and repeated k (k≥1) times within the pixel display period T3. For the side pixels P0 and P799 with the longest pixel display period T1, the on period which is equal to or longer than the relaxation oscillation time tro is set and repeated k times within the pixel display period T1. In this case, in both the center pixel P400 and the side pixels P0 and P799, the on period is repeated k times. However, the total time Σtro of the relaxation oscillation in the side pixels P0 and P799 is longer than that in the center pixel P400 (ton×k<tro× k). In this way, for the same reason as that in the above-described embodiment, with an increase in the pixel display period T3, a reduction in the temporal ratio of the relaxation oscillation is prevented. In the above-described embodiment, one of the number of relaxation oscillations and the length of the on period is adjusted. However, both the number of relaxation oscillations and the length of the on period may be adjusted.

In the above-described embodiment, when the horizontal scanning is performed by the resonance frequency, measures for the speckle noise remaining in the left and right end regions of the image has been described. However, the invention is not limited thereto, but can also be applied to the vertical scanning using the resonance frequency. In the vertical scanning using the resonance frequency, the speckle noise remains in the upper and lower end regions of the image. As shown in FIG. 4, a scanning speed Vv in the vertical direction is operatively associated with the deflection angle θv of the mirror 6b. The scanning speed Vv on lines L0 and L399 which are disposed on both sides of the image (in the vertical direction) is lower than that on a line L199 (θv≈0) which is disposed at the center of the image. In order to compensate for a difference in the scanning speed Vv, when one horizontal scanning period for the side lines L0 and 399 is longer than that for the center line L199, the pixel display period of the pixel on the side lines L0 and L399 is longer than that of the pixel on the center line L199. In this case, the pixels are disposed at the same position in the horizontal direction X. Similarly to the above-mentioned horizontal scanning, as the pixel display period increases (as the scanning speed Vv is reduced), the number of relaxation oscillations increases or the total time of the relaxation oscillations increases. In this way, a reduction in the temporal ratio of the relaxation oscillation in the pixel display period is prevented and it is possible to reduce the speckle noise remaining in the vertical direction Y.

INDUSTRIAL APPLICABILITY

As described above, the invention can be applied to an image display device which displays an image on a projection surface using scanning with laser light involving a variation in scanning speed. A representative example of the image display device is a scanning-mirror-type laser projector.

REFERENCE SIGNS LIST

1: LASER PROJECTOR
2a to 2c: LASER LIGHT SOURCE
3, 4: DICHROIC MIRROR
5: LENS
6: SCANNING MIRROR
6a: SUBSTRATE
6b: MIRROR
6c, 6e: ROTATING SHAFT
6d, 6f: FRAME
6g, 6h: COIL
6i: A PAIR OF ELECTRODES
6j: ONE PERMANENT MAGNET PAIR
6k: THE OTHER PERMANENT MAGNET PAIR
7: SCANNING MIRROR DRIVER
8: SCANNING MIRROR CONTROL UNIT
9: VIDEO PROCESSING UNIT
10: LASER CONTROL UNIT
10a: DRIVING MODE DETERMINING CIRCUIT
10b: DRIVING CURRENT SELECTION CIRCUIT
10c: WAVEFORM PATTERN SELECTION CIRCUIT
11: LASER DRIVER

The invention claimed is:

1. An image display device that displays an image on a projection surface using scanning with laser light involving a variation in scanning speed, comprising:
 a laser control unit that selects a first waveform pattern for generating a unique relaxation oscillation of a laser light source within a first pixel display period for a first pixel and selects a second waveform pattern for generating a larger number of relaxation oscillations than the first waveform pattern within a second pixel display period longer than the first pixel display period for a second pixel which is scanned at a lower scanning speed than the first pixel;
 a laser light source that emits the laser light with an output level corresponding to a display grayscale of the first pixel according to the first waveform pattern selected by the laser control unit and emits the laser light with an output level corresponding to a display grayscale of the second pixel according to the second waveform pattern selected by the laser control unit; and
 a scanning mirror that reflects the laser light related to the first pixel which is emitted from the laser light source and the laser light related to the second pixel which is emitted from the laser light source in a predetermined scanning order according to its deflection angle so as to be projected onto the projection surface.

2. The image display device according to claim 1,
 wherein the deflection angle of the scanning mirror is changed in a sine wave shape on a time axis.

3. An image display device that displays an image on a projection surface using scanning with laser light involving a variation in scanning speed, comprising:
 a laser control unit that selects a first waveform pattern including at least one on period which rises from an off state within a first pixel display period for a first pixel and selects a second waveform pattern including a larger number of on periods rising from the off state than the first waveform pattern within a second pixel display period longer than the first pixel display period for a second pixel which is scanned at a lower scanning speed than the first pixel;

a laser light source that emits the laser light with an output level corresponding to a display grayscale of the first pixel according to the first waveform pattern selected by the laser control unit and emits the laser light with an output level corresponding to a display grayscale of the second pixel according to the second waveform pattern selected by the laser control unit; and a scanning mirror that reflects the laser light related to the first pixel which is emitted from the laser light source and the laser light related to the second pixel which is emitted from the laser light source in a predetermined scanning order according to its deflection angle so as to be projected onto the projection surface.

4. The image display device according to claim 1,
wherein the display pixel period is set in a pixel unit.

5. The image display device according to claim 1,
wherein the display pixel period is set in an area unit including a plurality of adjacent pixels.

6. The image display device according to claim 3,
wherein the deflection angle of the scanning mirror is changed in a sine wave shape on a time axis.

7. The image display device according to claim 3,
wherein the first waveform pattern and the second waveform pattern are formed by repeating a constant modulation period including the on period and an off time which are generated on the basis of the same reference clock.

8. The image display device according to claim 7,
wherein a driving current supplied to the laser light source is set to a level equal to or less than a bias current of the laser light source within the off period, regardless of the display grayscale, and is set to a current level corresponding to the display grayscale with the on period.

9. The image display device according to claim 8,
wherein the deflection angle of the scanning mirror is changed in a sine wave shape on a time axis.

10. The image display device according to claim 7,
wherein the deflection angle of the scanning mirror is changed in a sine wave shape on a time axis.

11. The image display device according to claim 3,
wherein a driving current supplied to the laser light source is set to a level equal to or less than a bias current of the laser light source within the off period, regardless of the display grayscale, and is set to a current level corresponding to the display grayscale within the on period.

12. The image display device according to claim 11,
wherein the deflection angle of the scanning mirror is changed in a sine wave shape on a time axis.

13. The image display device according to claim 3,
wherein the display pixel period is set in a pixel unit.

14. The image display device according to claim 3,
wherein the display pixel period is set in an area unit including a plurality of adjacent pixels.

\* \* \* \* \*